(12) United States Patent
Miyamoto

(10) Patent No.: US 9,769,445 B2
(45) Date of Patent: Sep. 19, 2017

(54) DISPLAY DEVICE

(71) Applicant: HAMAMATSU PHOTONICS K.K., Hamamatsu-shi, Shizuoka (JP)

(72) Inventor: Yuichi Miyamoto, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/032,342

(22) PCT Filed: Jul. 10, 2014

(86) PCT No.: PCT/JP2014/068466
§ 371 (c)(1),
(2) Date: Apr. 27, 2016

(87) PCT Pub. No.: WO2015/064154
PCT Pub. Date: May 7, 2015

(65) Prior Publication Data
US 2016/0255319 A1    Sep. 1, 2016

(30) Foreign Application Priority Data
Oct. 29, 2013    (JP) .................... 2013-224174

(51) Int. Cl.
*H04N 9/31* (2006.01)
*G02B 27/01* (2006.01)
(Continued)

(52) U.S. Cl.
CPC ....... *H04N 9/3194* (2013.01); *G02B 27/0101* (2013.01); *G02B 27/104* (2013.01);
(Continued)

(58) Field of Classification Search
CPC .. H04N 9/3135; H04N 9/3155; H04N 9/3158; H04N 9/3164; H04N 9/317;
(Continued)

(56) References Cited

U.S. PATENT DOCUMENTS 6,995,846 B2 *  2/2006  Kalayeh ................ G01N 21/31
                                              250/338.5
7,837,334 B2 * 11/2010  Ito ..................... G02F 1/133385
                                              353/52
(Continued)

FOREIGN PATENT DOCUMENTS

CN    101882407    11/2010
CN    102819108    12/2012
(Continued)

OTHER PUBLICATIONS

International Preliminary Report on Patentability mailed May 12, 2016 for PCT/JP2014/068466.

*Primary Examiner* — Loha Ben
(74) *Attorney, Agent, or Firm* — Drinker Biddle & Reath LLP

(57) ABSTRACT

In a display device, a light amount of laser light directed from an optical filter to a combiner is controlled through control of a temperature of a light source using temperature dependence of a wavelength of the light source. Further, in the display device, since the adjustment of the light amount is performed using the temperature dependence of the wavelength of the light source instead of adjusting a power supply voltage of the light source.

11 Claims, 8 Drawing Sheets

(51) Int. Cl.
*G02B 27/10* (2006.01)
*G02F 1/01* (2006.01)

(52) U.S. Cl.
CPC .......... *G02F 1/0147* (2013.01); *H04N 9/317* (2013.01); *H04N 9/3135* (2013.01); *H04N 9/3164* (2013.01); *G02B 2027/013* (2013.01); *G02B 2027/014* (2013.01); *G02B 2027/0114* (2013.01); *G02B 2027/0118* (2013.01); *H04N 9/3155* (2013.01); *H04N 9/3158* (2013.01)

(58) Field of Classification Search
CPC ... H04N 9/3194; G02F 1/0121; G02F 1/0147; G02B 27/01; G02B 27/0101; G02B 27/104; G02B 2027/0114; G02B 2027/0118; G02B 2027/013; G02B 2027/014
USPC .................. 359/207.11, 618, 630–634, 820; 345/7–9, 48, 76, 102, 633; 353/55, 56; 362/611
See application file for complete search history.

(56) References Cited

U.S. PATENT DOCUMENTS

| | | | |
|---|---|---|---|
| 8,432,353 B2 * | 4/2013 | Nagata | G02B 6/0028 345/102 |
| 8,681,143 B2 * | 3/2014 | Sugiyama | G02B 27/01 345/214 |
| 2002/0135830 A1 | 9/2002 | Endo et al. | |
| 2012/0236046 A1 | 9/2012 | Sugiyama et al. | |

FOREIGN PATENT DOCUMENTS

| | | |
|---|---|---|
| JP | H04-70775 A | 3/1992 |
| JP | H07-8624 B2 | 2/1995 |
| JP | 2012-032721 A | 2/2012 |
| JP | 2012-044189 | 3/2012 |
| JP | 2012-078619 A | 4/2012 |
| WO | WO 2011/132407 | 10/2011 |
| WO | WO 2012/042744 | 4/2012 |

* cited by examiner

Fig.8 (a)
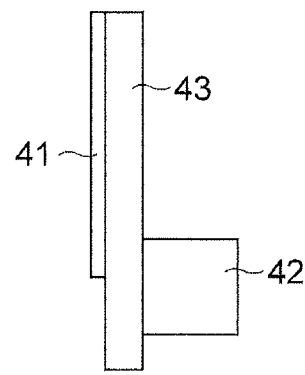
(b)
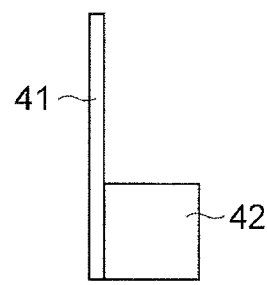
(c)
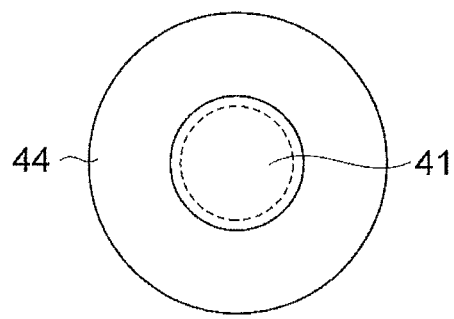
(d)
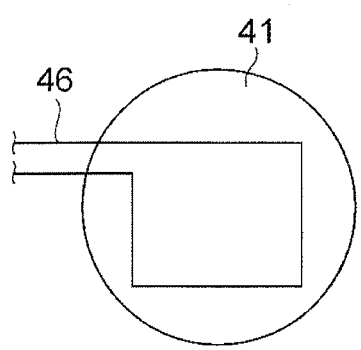

DISPLAY DEVICE

TECHNICAL FIELD

The present invention relates to a display device.

BACKGROUND ART

In recent years, for example, a display device such as a head-up display or a head-mounted display that projects a projection image onto a display arranged in front in a field of view of a user and displays the image in a state in which the image is superimposed on a background has been developed. A technology regarding such a display device includes, for example, a head-up display described in Patent Literature 1. In this head-up display of the related art, in order to prevent the visibility of the projection image displayed on the display from being obstructed by the brightness of environmental light, a sensor for measuring the environmental light is arranged near the display, and an output of a light source used for a display of the projection image (luminance of the projection image displayed on the display) is adjusted according to a result of the detection of the sensor.

CITATION LIST

Patent Literature

[Patent Literature 1] Japanese Examined Patent Publication No. H7-8624

SUMMARY OF INVENTION

Technical Problem

In the display device of the related art described above, the visibility of the projection image displayed on the display is secured by adjusting the output of the light source. However, for example, in a display device including an LD as a light source, a relationship between a driving current and the output near a threshold current (minimum current with which laser oscillation is possible) may not be linear, and there is a problem in that a luminance adjustment range is narrowed in the adjustment of the luminance through control of the current of the light source. In this regard, in a liquid crystal projection type display device using a liquid crystal display, the adjustment of luminance of a liquid crystal element itself can be performed, whereas in a scanning projection type display device in which a display is scanned with light from a light source, it is necessary for a means for adjusting an amount of light directed to the display to be separately considered.

The present invention has been made to solve the above problem, and an object thereof is to provide a display device capable of accurately adjusting an amount of light directed to a display according to the brightness of environmental light and satisfactorily ensuring the visibility of a projection image displayed on the display.

Solution to Problem

In order to solve the above problem, a display device according to an aspect of the present invention includes an optical scanning device including a light source that outputs light, an optical scanning unit that scans the output light from the light source, and an optical filter arranged on an optical path of the output light; a display onto which the output light scanned by the optical scanning device is projected, with the output light superimposed on a background; and a temperature control unit that controls a temperature of the optical scanning device and controls a light amount of the output light directed from the optical filter to the display.

In this display device, the light amount of the output light directed from the optical filter to the display is controlled through control of the temperature of the optical scanning device. Accordingly, even when the display device is a scanning projection type in which the display itself is incapable of luminance adjustment, it is possible to adjust the amount of light directed to the display according to the brightness of the environmental light, and to satisfactorily ensure the visibility of the projection image displayed on the display. Further, since the adjustment of the light amount is performed using the temperature instead of adjusting a power supply voltage of the light source, it is possible to accurately adjust the light amount of the output light directed to the display by appropriately designing characteristics of the optical filter.

Further, the light source may be a light source of which a wavelength of the output light has temperature dependence, and the temperature control unit may control temperature of the light source. In this case, it is possible to accurately adjust the light amount of the output light directed to the display by designing characteristics such as transmittance or reflectance of the optical filter.

Further, the optical filter may be a filter of which a band characteristic has temperature dependence, and the temperature control unit may control a temperature of the optical filter. In this case, it is possible to accurately adjust the light amount of the output light directed to the display through a design of a thermal expansion coefficient of a material constituting the optical filter.

Further, the display device may further include an environmental light detection sensor that detects a light amount of environmental light, and the temperature control unit may control the temperature of the optical scanning device based on the light amount of the environmental light detected by the environmental light detection sensor. In this case, it is possible to adjust the light amount of the output light directed to the display more accurately based on a result of the detection of the environmental light detection sensor.

Further, the optical filter may be arranged between the light source and the optical scanning unit. Since the optical filter may have angle dependence, if the optical filter is arranged on a subsequent stage side relative to the optical scanning unit, the characteristics of the optical filter may be considered to vary due to scanning. Accordingly, by arranging the optical filter between the light source and the optical scanning unit, it is possible to accurately adjust the light amount of the output light directed to the display.

Further, the optical filter may be provided separately from another optical element forming the optical path of the output light. In this case, the angle of the optical filter can be adjusted separately from the other optical element. Accordingly, for example, even when the characteristics of the optical filter vary from lot to lot, adjustment to desired characteristics is easily performed by adjusting the angle of the optical filter while maintaining the optical path of the output light.

Further, the light source may include a plurality of light sources of which wavelengths of output light beams are different from each other, and the display device may further include a light combination unit that combines the respective output light beams from the plurality of light sources. In this case, it is possible to display the projection image as a color image on the display.

Further, the optical filter may be arranged on a subsequent stage side of the optical path relative to the light combination unit. In this case, since the light amount of each output light can be adjusted in a single optical filter, simplification of the device configuration can be achieved.

Further, the optical filter may be arranged between each light source and the light combination unit. In this case, the optical filter according to a wavelength of each light source is manufactured. Accordingly, a design of each optical filter is facilitated.

Further, the display device may further include a temperature detection sensor that detects a temperature of the optical scanning device. Accordingly, the light amount of the output light directed from the optical filter to the display can be adjusted more accurately.

Further, the display device may further include a light amount detection sensor that detects a light amount of the output light directed from the optical filter to the display. Accordingly, the light amount of the output light directed from the optical filter to the display can be adjusted more accurately.

Advantageous Effects of Invention

According to one aspect of the present invention, it is possible to accurately adjust the output of the light source according to the brightness of the environmental light and to satisfactorily ensure the visibility of the projection image displayed on the display.

BRIEF DESCRIPTION OF DRAWINGS

FIGS. 8(a) to 8(d) are diagrams illustrating an example of a form of attachment of a temperature control element to the optical filter.

DESCRIPTION OF EMBODIMENTS

Hereinafter, preferred embodiments of a display device according to the present invention will be described in detail with reference to the accompanying drawings.

Figure 1:
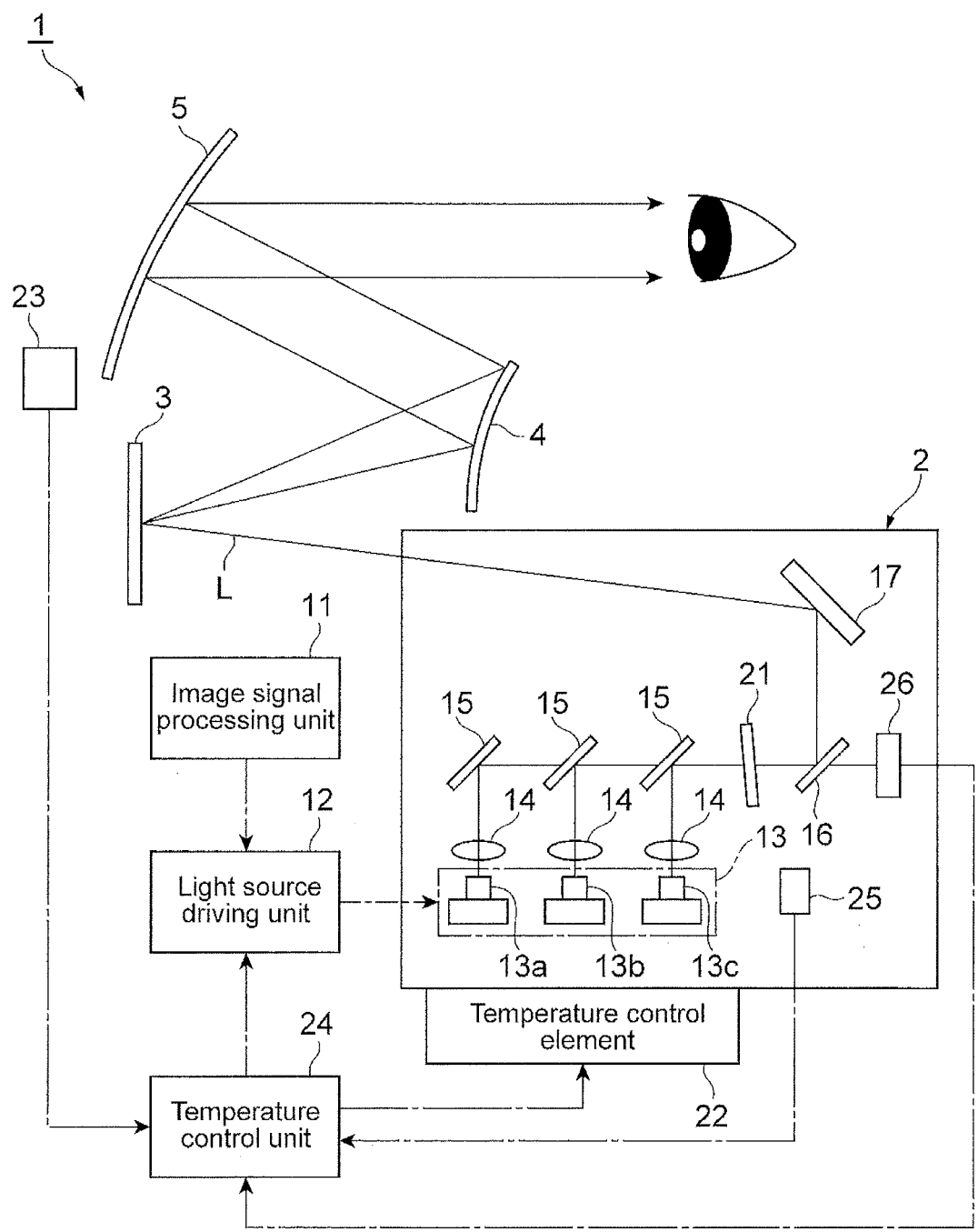
FIG. 1 is a diagram illustrating an embodiment of a display device according to the present invention.

FIG. 1 is a diagram illustrating an embodiment of a display device according to the present invention. As illustrated in FIG. 1, a display device 1 includes, for example, an optical scanning device 2, an image plane diffusion screen 3, a reflective mirror 4, and a combiner (display) 5. This display device 1 is configured as, for example, a head-up display for a vehicle. A primary image formed by laser light (output light) L modulated with a projection signal in the optical scanning device 2 is projected onto the combiner 5 via the image plane diffusion screen 3 and the reflective mirror 4. The combiner 5 is, for example, a front windshield of the vehicle, and a projection image displayed by the laser light L modulated with the projection signal is visible to a user in a state in which the projection image is superimposed on a background.

The optical scanning device 2 has a configuration for scanning the combiner 5 with the laser light L and includes, for example, an image signal processing unit 11, a light source driving unit 12, a light source 13, condenser lenses 14, dichroic mirrors (light combination units) 15, a half mirror 16, and a signal scanning driving mirror (optical scanning unit) 17. The image signal processing unit 11 is a unit that generates a projection signal. Further, the light source driving unit 12 is a unit that controls, for example, output and modulation of the light source 13. The projection signal generated by the image signal processing unit 11 is output to the light source driving unit 12, and the laser light L modulated with the projection signal is output from the light source 13.

The light source 13 includes units of a plurality of light sources 13a (red), 13b (green), and 13c (blue) that emit the laser light L corresponding to a wavelength of each of colors RGB. For example, a light source of which a wavelength of output light has temperature dependence, such as a laser diode (LD), a vertical cavity surface emitting laser (VCSEL), a super luminescent diode (SLD), or a light emitting diode (LED), is used as the light source 13. Further, the condenser lenses 14 are respectively arranged in a preceding stage of the light sources 13a, 13b, and 13c, and the dichroic mirrors 15 are respectively arranged in a preceding stage of the condenser lenses 14. The laser light L emitted from the light sources 13a, 13b, and 13c is combined by the dichroic mirrors 15 via the condenser lenses 14, reflected by the half mirror 16, and guided to the signal scanning driving mirror 17.

The signal scanning driving mirror 17 is, for example, an electromagnetic driving type optical mirror which is manufactured using micro electro mechanical systems (MEMS) technology. The signal scanning driving mirror 17 can fluctuate at a predetermined frequency based on a control signal from a drive control unit (not illustrated). As the signal scanning driving mirror 17 fluctuates, the combiner 5 is scanned with the laser light L from the light source 13, and the projection image is displayed.

In the display device 1 described above, for example, when a light amount of the environmental light is large, such as in daytime, it is necessary for a light amount (luminance) of the projection image projected onto the combiner 5 to be increased from the point of view of visibility. For example, when the light amount of the environmental light is small, such as at night or inside a tunnel, it is necessary for the light amount (luminance) of the projection image projected onto the combiner 5 to be decreased. Therefore, the display device 1 includes an optical filter 21, a temperature control element 22, an environmental light detection sensor 23, and a temperature control unit 24, as illustrated in FIG. 1, as a configuration for adjusting the light amount of the projection image according to the light amount of the environmental light.

The optical filter 21 is, for example, a light shielding filter that blocks light in a predetermined wavelength band. The optical filter 21 is arranged between the dichroic mirrors 15 and the half mirror 16 in an optical path of the laser light L. Further, the temperature control element 22 is, for example, a Peltier element. The temperature control element 22 is arranged with respect to the light source 13, and controls a temperature of the light source 13 based on a control signal from the temperature control unit 24.

The environmental light detection sensor 23 is a sensor that detects a light amount of the environmental light around the combiner 5. The environmental light detection sensor 23 appropriately outputs a result of the detection of the light amount of the environmental light to the temperature control unit 24. When the display device 1 is a head-up display for a vehicle, a sensor used for ON and OFF of lights of the vehicle may be used as the environmental light detection sensor 23. Further, the environmental light detection sensor 23 may be arranged inside the vehicle or may be arranged outside the vehicle.

Figure 2:
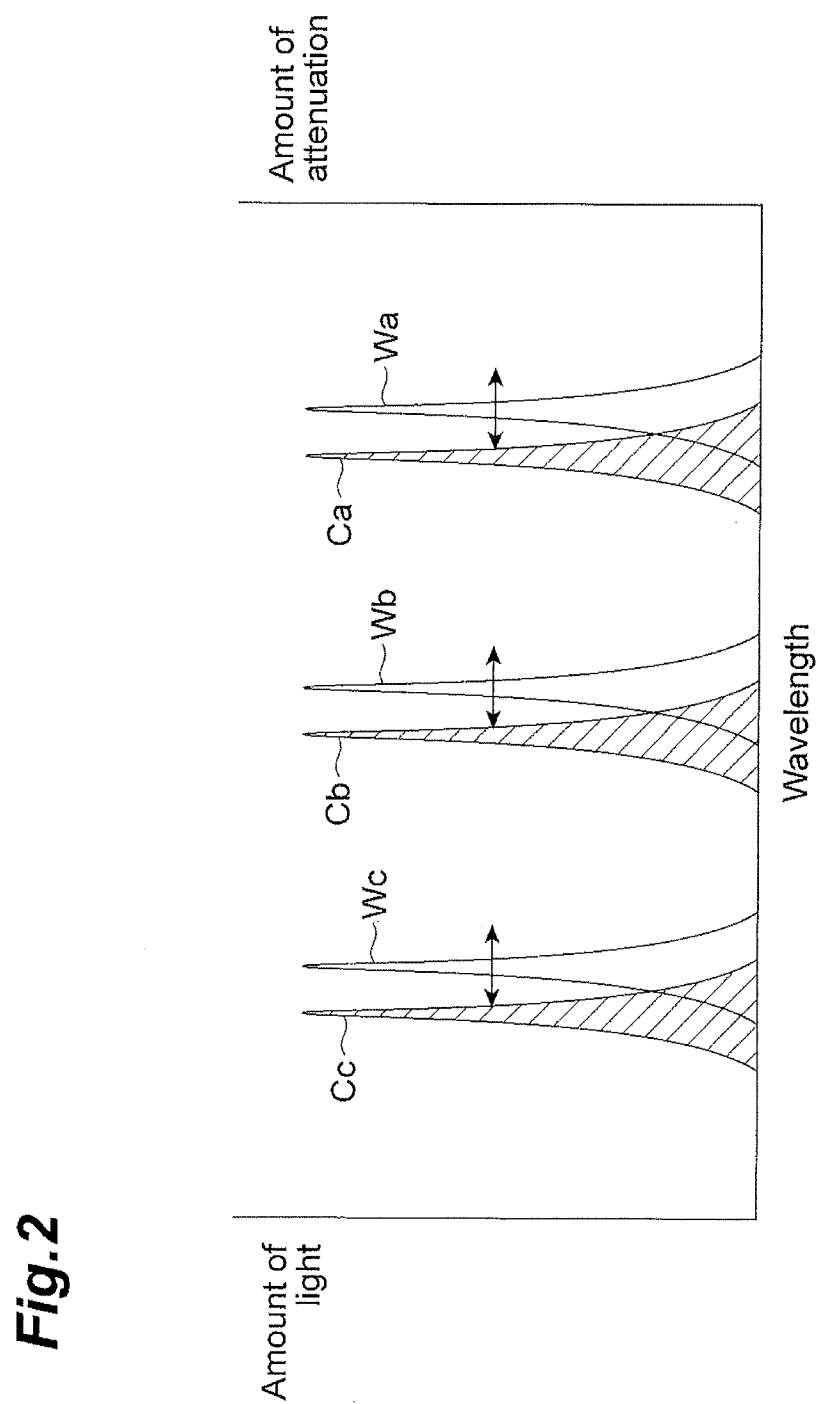
FIG. 2 is a diagram illustrating an example of light amount control performed by a temperature control unit in a case in which a light shielding filter is used as an optical filter.

The temperature control unit 24 is a unit that controls the operation of the temperature control element 22. The temperature control unit 24 executes temperature adjustment of the light source 13 performed by the temperature control element 22 based on the detection result from the environmental light detection sensor 23. FIG. 2 is a diagram illustrating an example of light amount control performed by the temperature control unit 24 in a case in which the light shielding filter is used as an optical filter 21.

In the example illustrated in FIG. 2, a horizontal axis indicates a wavelength and a vertical axis indicates the amount of light and an amount of attenuation. A wavelength band Wa of red laser light from the light source 13a, a wavelength band Wb of green laser light from the light source 13b, and a wavelength band Wc of blue laser light from the light source 13c are plotted. Thus, the light shielding filter has a shield band Ca which is on a short wavelength side relative to the wavelength band Wa of the red laser light, a shield band Cb which is on a short wavelength side relative to the wavelength band Wb of the green laser light, and a shield band Cc which is on a short wavelength side relative to the wavelength band Wc of the blue laser light.

In this case, the temperature control unit 24 controls the temperature control element 22 so that the temperature of the light source 13 is shifted to a high temperature side, according to an increase in the light amount of the environmental light detected by the environmental light detection sensor 23. Accordingly, the wavelength bands Wa, Wb, and Wc are respectively separated from the shield bands Ca, Cb, and Cc, and the light amount of the laser light L directed from the optical filter 21 to the combiner 5 can increase.

On the other hand, the temperature control unit 24 controls the temperature control element 22 so that the temperature of the light source 13 is shifted to a low temperature side, according to a decrease in the light amount of the environmental light detected by the environmental light detection sensor 23. Accordingly, the wavelength bands Wa, Wb, and Wc respectively approach the shield bands Ca, Cb, and Cc, and the light amount of the laser light L directed from the optical filter 21 to the combiner 5 can decrease.

By the execution of such control, the luminance of the projection image on the combiner 5 is increased when the light amount of the environmental light is large, and the luminance of the projection image on the combiner 5 is decreased when the light amount of the environmental light is small. Accordingly, it is possible to satisfactorily ensure visibility of the projection image. Further, in this embodiment, the shield bands Ca, Cb, and Cc of the optical filter 21 are set to the short wavelength side of the wavelength bands Wa, Wb, and Wc. For example, an air temperature around the display device 1 is considered to be high at daytime at which the light amount of the environmental light is large. Further, the air temperature around the display device 1 is considered to be low at night at which the light amount of the environmental light is small. In this embodiment, since the temperature of the light source 13 is shifted to the high temperature side when the air temperature around the display device 1 is high, and the temperature of the light source 13 is shifted to the low temperature side when the air temperature around the display device 1 is low, it is possible to suppress power consumption when the temperature control element 22 is controlled by the temperature control unit 24.

Figure 3:
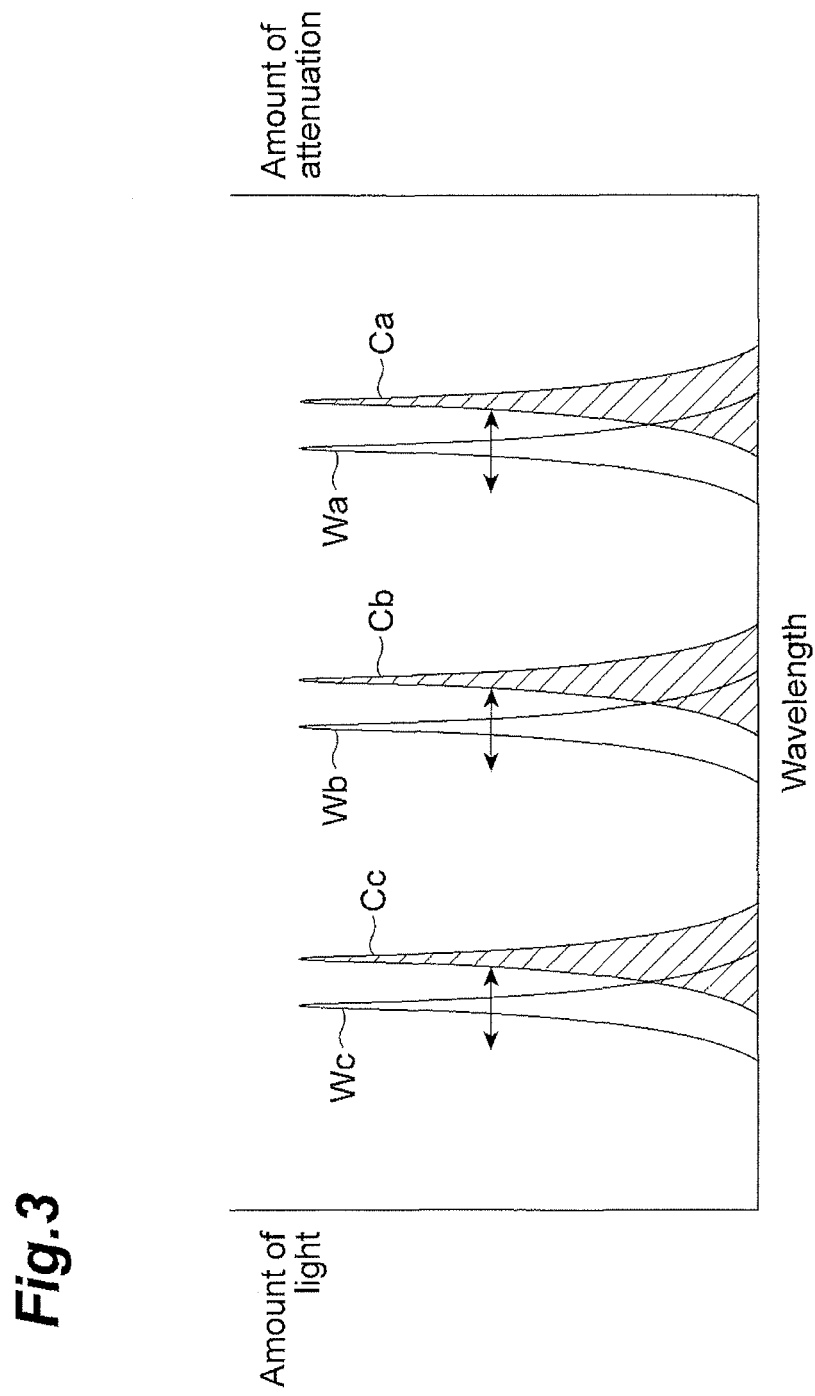
FIG. 3 is a diagram illustrating a modification example of light amount control performed by the temperature control unit in a case in which the light shielding filter is used as the optical filter.

Further, FIG. 3 is a diagram illustrating a modification example of the light amount control performed by the temperature control unit 24 in a case in which the light shielding filter is used as the optical filter 21. In the example illustrated in FIG. 3, the light shielding filter has a shield band Ca which is on a long wavelength side relative to the wavelength band Wa of the red laser light, a shield band Cb which is on a long wavelength side relative to the wavelength band Wb of the green laser light, and a shield band Cc which is on a long wavelength side relative to the wavelength band Wc of the blue laser light.

In this case, the temperature control unit 24 controls the temperature control element 22 so that the temperature of the light source 13 is shifted to a low temperature side, according to an increase in the light amount of the environmental light detected by the environmental light detection sensor 23. Accordingly, the wavelength bands Wa, Wb, and Wc are respectively separated from the shield bands Ca, Cb, and Cc, and the light amount of the laser light L directed from the optical filter 21 to the combiner 5 can increase.

On the other hand, the temperature control unit 24 controls the temperature control element 22 so that the temperature of the light source 13 is shifted to a high temperature side, according to a decrease in the light amount of the environmental light detected by the environmental light detection sensor 23. Accordingly, the wavelength bands Wa, Wb, and Wc respectively approach the shield bands Ca, Cb, and Cc, and the light amount of the laser light L directed from the optical filter 21 to the combiner 5 can decrease.

By the execution of such control, the luminance of the projection image on the combiner 5 is increased when the light amount of the environmental light is large, and the luminance of the projection image on the combiner 5 is decreased when the light amount of the environmental light is small. Accordingly, it is possible to satisfactorily ensure visibility of the projection image. Further, in this embodiment, the shield bands Ca, Cb, and Cc of the optical filter 21 are set to the long wavelength side of the wavelength bands Wa, Wb, and Wc. In this embodiment, since the temperature of the light source 13 is shifted to the low temperature side when the air temperature around the display device 1 is high, and the temperature of the light source 13 is shifted to the high temperature side when the air temperature around the display device 1 is low, it is possible to prevent the temperature of the light source 13 from excessively increasing or decreasing. Further, it is possible to prevent the wavelength of the light source 13 from being excessively shifted to the long wavelength side or the short wavelength side, and suppress a color change of the projection image.

Figure 4:
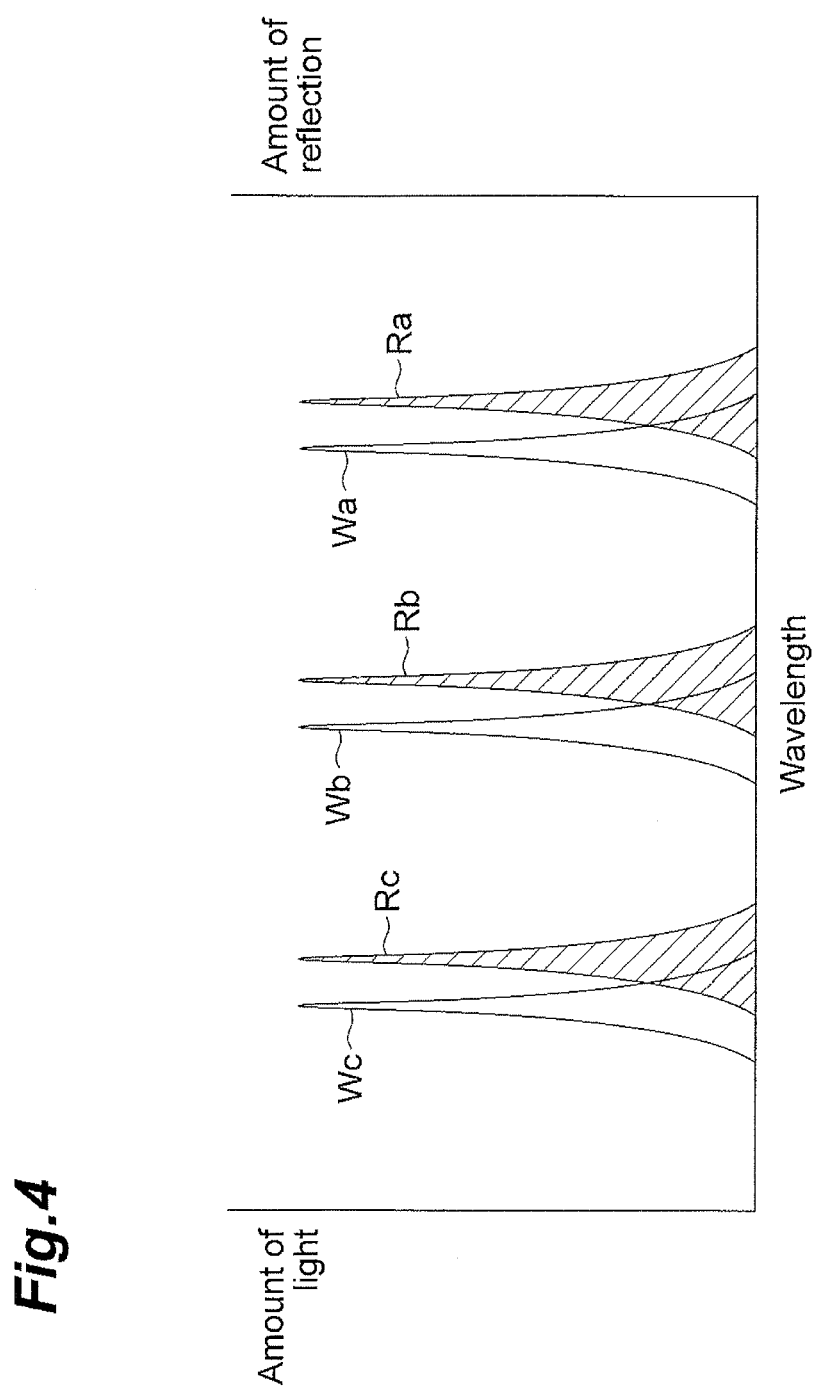
FIG. 4 is a diagram illustrating an example of light amount control performed by the temperature control unit in a case in which an optical reflection filter is used as the optical filter.

Further, while the light shielding filter is exemplified as the optical filter 21 in the examples of FIGS. 2 and 3, the same operation and effect can be obtained even when an optical reflection filter is used as the optical filter 21. FIG. 4 is a diagram illustrating a modification example of the light amount control performed by the temperature control unit 24 in a case in which the optical reflection filter is used as the optical filter 21.

In the example illustrated in FIG. 4, a horizontal axis indicates the wavelength and a vertical axis indicates the light amount and an amount of reflection. The optical reflection filter has a reflective band Ra that is on a long wavelength side relative to the wavelength band Wa of the red laser light, a reflective band Rb that is on a long wavelength side relative to the wavelength band Wb of the green laser light, and a reflective band Rc that is on a long wavelength side relative to the wavelength band Wc of the blue laser light.

In this case, the temperature control unit 24 controls the temperature control element 22 so that the temperature of the light source 13 is shifted to a high temperature side, according to an increase in the light amount of the environmental light detected by the environmental light detection sensor 23. Accordingly, the wavelength bands Wa, Wb, and Wc respectively approach the reflective bands Ra, Rb, and Rc, and the light amount of the laser light L reflected by the optical filter 21 and directed to the combiner 5 can increase.

On the other hand, the temperature control unit 24 controls the temperature control element 22 so that the temperature of the light source 13 is shifted to a low temperature side, according to a decrease in the light amount of the environmental light detected by the environmental light detection sensor 23. Accordingly, the wavelength bands Wa, Wb, and Wc are respectively separated from the reflective bands Ra, Rb, and Rc, and the light amount of the laser light L reflected by the optical filter 21 and directed to the combiner 5 can decrease.

By the execution of such control, the luminance of the projection image on the combiner 5 is increased when the light amount of the environmental light is large, and the luminance of the projection image on the combiner 5 is decreased when the light amount of the environmental light is small. Accordingly, it is possible to satisfactorily ensure visibility of the projection image. Further, since the temperature of the light source 13 is shifted to the high temperature side when the air temperature around the display device 1 is high, and the temperature of the light source 13 is shifted to the low temperature side when the air temperature around the display device 1 is low, similar to the case of FIG. 2, it is possible to suppress power consumption when the temperature control element 22 is controlled by the temperature control unit 24.

Further, although not illustrated, an optical reflection filter having a reflective band Ra which is on a short wavelength side relative to the wavelength band Wa of the red laser light, a reflective band Rb which is on a short wavelength side relative to the wavelength band Wb of the green laser light, and a reflective band Rc which is on a short wavelength side relative to the wavelength band Wc of the blue laser light may be used.

In this case, the temperature control unit 24 controls the temperature control element 22 so that the temperature of the light source 13 is shifted to a low temperature side, according to an increase in the light amount of the environmental light detected by the environmental light detection sensor 23. Accordingly, the wavelength bands Wa, Wb, and Wc respectively approach the reflective bands Ra, Rb, and Rc, and the light amount of the laser light L reflected by the optical filter 21 and directed to the combiner 5 can increase.

On the other hand, the temperature control unit 24 controls the temperature control element 22 so that the temperature of the light source 13 is shifted to a high temperature side, according to a decrease in the light amount of the environmental light detected by the environmental light detection sensor 23. Accordingly, the wavelength bands Wa, Wb, and Wc are respectively separated from the reflective bands Ra, Rb, and Rc, and the light amount of the laser light L reflected by the optical filter 21 and directed to the combiner 5 can decrease.

By the execution of such control, the luminance of the projection image on the combiner 5 is increased when the light amount of the environmental light is large, and the luminance of the projection image on the combiner 5 is decreased when the light amount of the environmental light is small. Accordingly, it is possible to satisfactorily ensure visibility of the projection image. Further, since the temperature of the light source 13 is shifted to the low temperature side when the air temperature around the display device 1 is high, and the temperature of the light source 13 is shifted to the high temperature side when the air temperature around the display device 1 is low, similar to the case of FIG. 3, it is possible to prevent the temperature of the light source 13 from excessively increasing or decreasing. Further, it is possible to prevent the wavelength of the light source 13 from being excessively shifted to the long wavelength side or the short wavelength side, and suppress a color change of the projection image.

The temperature control unit 24 may include a temperature detection sensor 25 that detects temperature of the light source 13, and a light amount detection sensor 26 that detects a light amount of the laser light L directed from the optical filter 21 to the combiner 5. The temperature detection sensor is arranged, for example, near the light source 13, and detects the temperature of the light source 13. Further, the light amount detection sensor 26 is arranged on a subsequent stage side of the half mirror 16, and detects a light amount of one beam (light not directed to the signal scanning driving mirror) of the laser light L branched by the half mirror 16. A result of the detection of the temperature of the light source 13 by the temperature detection sensor 25 and a result of the detection of the light amount of the laser light L by the light amount detection sensor 26 are fed back to the temperature control unit 24. Accordingly, it is possible to more accurately execute the control of the temperature control element 22 performed by the temperature control unit 24, and to more accurately adjust the light amount of the laser light L directed from the optical filter 21 to the combiner 5.

In a case in which the LD is used as the light source 13, a change in a wavelength of the LD according to a change in the temperature is relatively small, for example, approximately 0.6 nm/° C. Further, a lifetime of the LD is considered to be affected in a high temperature state, and an excessive change in the wavelength may impair color reproducibility of the projection image. Therefore, it is preferable for the shield bands Ca, Cb, and Cc or the reflective bands Ra, Rb, and Rc of the optical filter 21 to have a steep slope, particularly, at the side of the wavelength bands Wa, Wb, and Wc. For example, an attenuation curve of the optical filter 21 has a slope to the extent that the light amount of the laser light L is reduced by 10% when the wavelength of the laser light L is shifted to the shield band side by approximately 20 nm. The shift of the wavelength of 20 nm corresponds to a change in temperature of approximately 30° C. if a wavelength change characteristic of the light source 13 is 0.6 nm/° C. Accordingly, it is possible to adjust the light amount of the laser light L, for example, by changing the temperature of the light source 13 in a range from 15° C. to 45° C.

Figure 5:
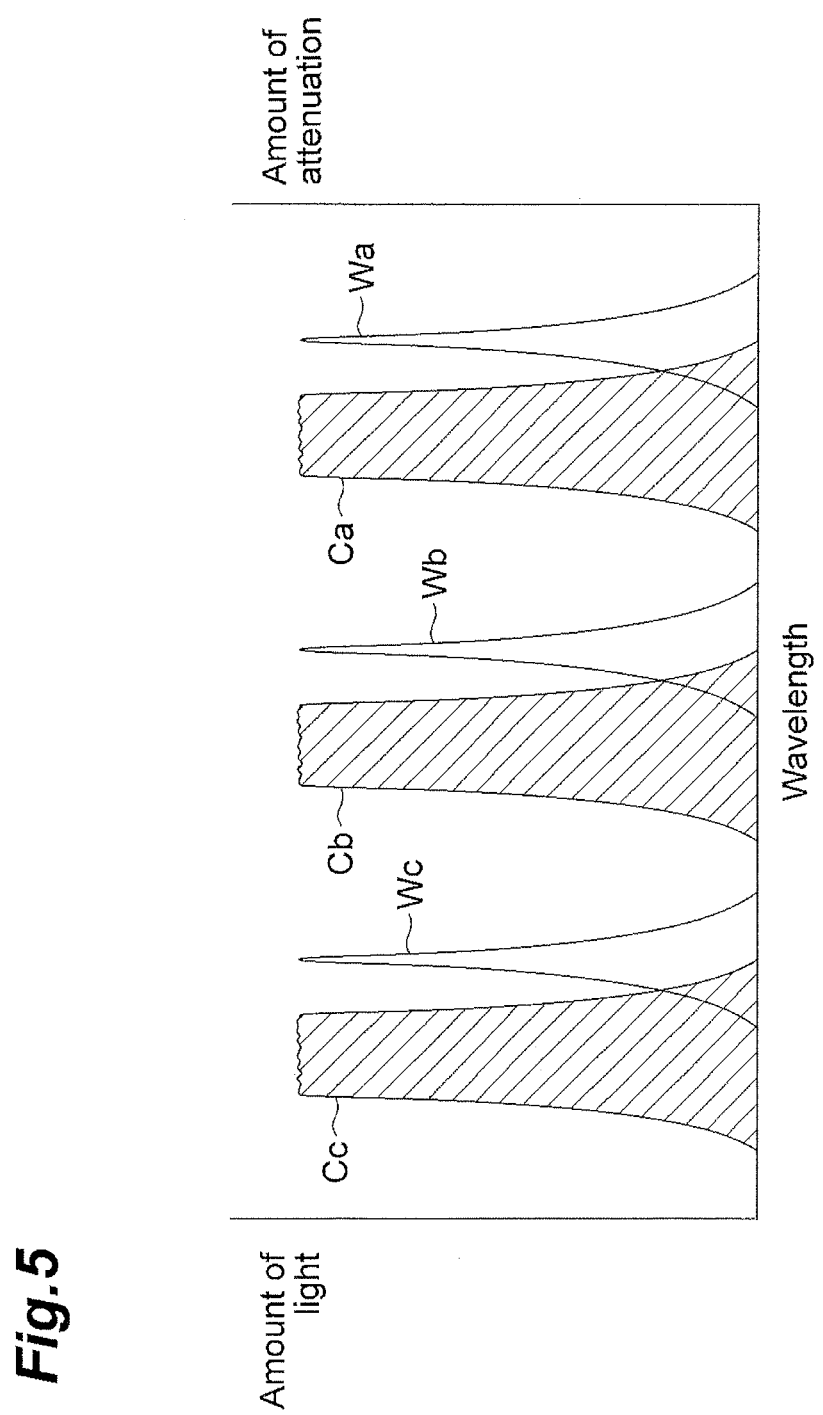
FIG. 5 is a diagram illustrating another modification example of light amount control performed by the temperature control unit in a case in which the light shielding filter is used as the optical filter.
Figure 6:
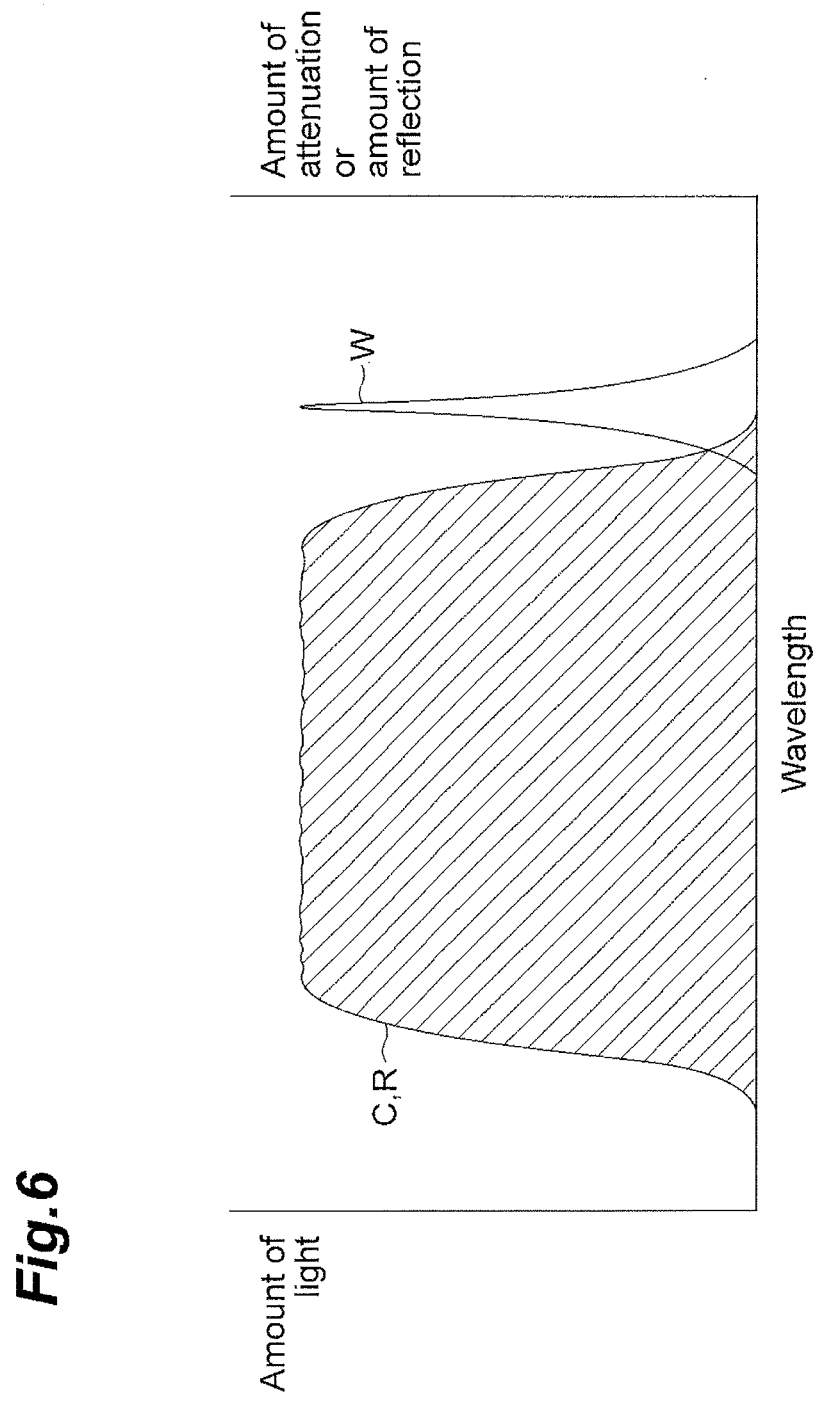
FIG. 6 is a diagram illustrating another modification example of light amount control performed by the temperature control unit in a case in which the light shielding filter is used as the optical filter.

While the shield bands Ca, Cb, and Cc or the reflective bands Ra, Rb, and Rc of the optical filter 21 are the same narrow bands as the wavelength bands Wa, Wb and Wc in the examples illustrated in FIGS. 2 to 4, the shield bands Ca, Cb, and Cc of the optical filter 21 may be a wider band than the wavelength bands Wa, Wb, and Wc, as illustrated in FIG. 5. The same applies to the reflective bands Ra, Rb, and Rc. Further, for example, in a case in which optical filters 21 are respectively arranged on a subsequent stage side of the sources 13a, 13b, and 13c (for example, between the condenser lenses 14 and the dichroic mirrors 15), the optical filters 21 may have the shield band C or the reflective band R considering only the wavelength band W of the corresponding light source 13, as illustrated in FIG. 6. In any of the examples, it is preferable for the shield bands Ca, Cb, and Cc or the reflective bands Ra, Rb, and Rc of the optical filter 21 to have a steep slope at least at the side of the wavelength bands Wa, Wb, and Wc.

As in the embodiment illustrated in FIG. 1, in a case in which the optical filter 21 is arranged on a subsequent stage side relative to the dichroic mirrors 15, the light amount of each output light can be adjusted in the single optical filter 21. Accordingly, simplification of the device configuration is achieved. Further, when the optical filters 21 are respectively arranged between the light sources 13 and the dichroic mirrors 15, the optical filter 21 according to the wavelength of each light source 13 is manufactured. Accordingly, a design of each optical filter 21 is facilitated.

Further, the characteristics (shield band and reflective band) of the optical filter 21 is considered to slightly vary from lot to lot. An influence of such a variation in the characteristics of the optical filter 21 can be eliminated through adjustment of the temperature of the light source 13, but an increase in a load of the light source 13 or an increase in power consumption required for control of the temperature control element 22 becomes a problem when the variation in the characteristics is large.

In order to solve such a problem, in the display device 1, the optical filter 21 is provided separately from other optical elements (which refer to the dichroic mirrors 15, the half mirror 16, and the signal scanning driving mirror 17 here) forming the optical path of the laser light L, the angle of the optical filter 21 with respect to the optical axis of the laser light L can be adjusted separately from the other optical elements. Accordingly, for example, even when the characteristics of the optical filter 21 vary from lot to lot, the adjustment to desired characteristics is easily performed by adjusting the angle of the optical filter 21 while maintaining the optical path of the laser light L.

Further, it is necessary for the optical filter 21 to be arranged between the light source 13 and the signal scanning driving mirror 17 in consideration of the above-described angle dependence. If the optical filter 21 is arranged on a subsequent stage side relative to the signal scanning driving mirror 17, the characteristics of the optical filter 21 can be considered to fluctuate due to scanning. Therefore, by arranging the optical filter 21 between the light source 13 and the signal scanning driving mirror 17, it is possible to accurately adjust the light amount of the laser light L directed to the combiner 5.

While the optical filter 21 is arranged between the dichroic mirrors 15 and the half mirror 16 in this embodiment, the optical filter 21 may be arranged between the light source 13 and the dichroic mirrors 15 or between the half mirror 16 and the signal scanning driving mirror 17. However, in a case in which the optical filter 21 is arranged between the half mirror 16 and the signal scanning driving mirror 17, the detection of the light amount of the laser light L by the light amount detection sensor 26 cannot be performed in the optical system illustrated in FIG. 1. Accordingly, it is not necessary for the half mirror to be necessarily used.

As described above, in the display device 1, the light amount of the laser light L directed from the optical filter 21 to the combiner 5 is controlled through control of the temperature of the light source 13 using the temperature dependence of the wavelength of the light source 13. Accordingly, even when the display device 1 is a scanning projection type in which the combiner 5 itself is incapable of luminance adjustment, it is possible to adjust the amount of light directed to the combiner 5 according to the brightness of the environmental light, and to satisfactorily ensure the visibility of the projection image displayed on the combiner 5. Further, in the display device 1, since the adjustment of the light amount is performed using the temperature dependence of the wavelength of the light source 13 instead of adjusting a power supply voltage of the light source 13, it is possible to accurately adjust the light amount of the laser light L directed to the combiner 5 by appropriately designing characteristics such as transmittance or reflectance of the optical filter 21.

The present invention is not limited to the above embodiment. For example, while the case in which the display device 1 is applied to the head-up display for a vehicle has been illustrated in the above embodiment, the display device according to the present invention may be applied to, for example, an eyeglasses type head mounted display.

Figure 7:
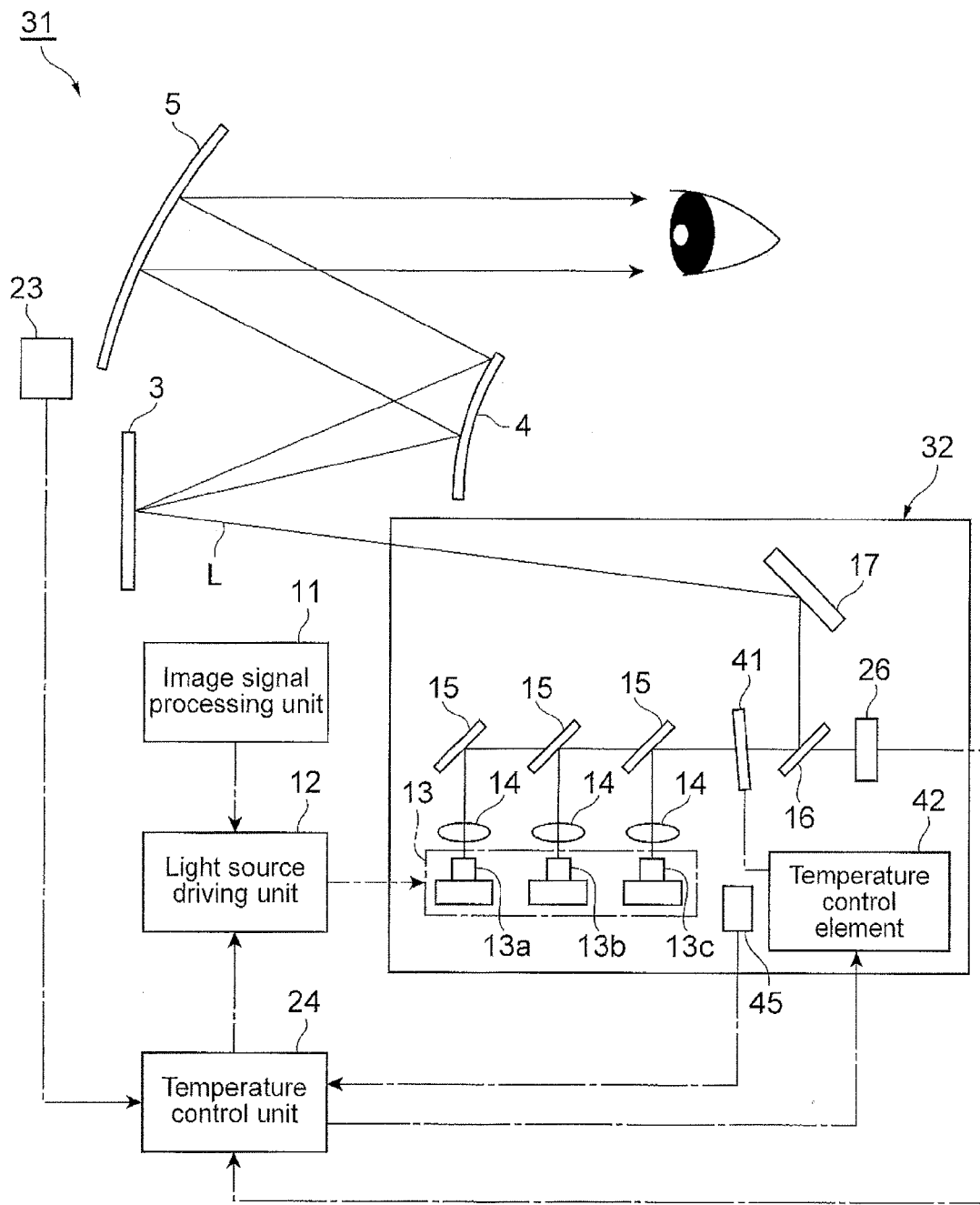
FIG. 7 is a diagram illustrating a modification example of the display device according to the present invention.

Further, FIG. 7 is a diagram illustrating a modification example of the display device according to the present invention. As illustrated in FIG. 7, in a display device 31 according to the modification example, an optical filter 41 of which the band characteristics have temperature dependence is used in an optical scanning device 32, and a temperature control element 42 is attached to the optical filter 41. In this display device 31, a temperature of the optical filter 41 is controlled by the temperature control element 42, characteristics (shield band and reflective band) of the optical filter 41 are shifted to a long wavelength side or a short wavelength side, and a light amount of the laser light L directed from the optical filter 41 to a combiner 5 is controlled.

In such an embodiment, even when the display device 31 is a scanning projection type in which the combiner 5 itself is incapable of luminance adjustment, it is possible to adjust the amount of light directed to the combiner 5 according to the brightness of the environmental light, and to satisfactorily ensure the visibility of the projection image displayed on the combiner 5, similar to the above embodiment. In this display device 31, it is preferable for a temperature detection sensor 45 to be arranged near the optical filter 41, detect the temperature of the optical filter 41, and output the temperature to a temperature control unit 24.

For example, a polymeric wavelength filter formed of a polymeric resin material may be used as the optical filter 41 of which the band characteristics have temperature dependence. In the polymeric wavelength filter having a phase separation structure, the band characteristics can be changed based on temperature according to a linear expansion coefficient of the material.

FIGS. 8(a) to 8(d) are diagrams illustrating examples of a form of attachment of the temperature control element 42 to the optical filter 41. When the temperature control element 42 is attached to the optical filter 41, for example, a supporting member 43 formed as a member (for example, glass) having transparency with respect to the laser light L may be fixed to one surface of the optical filter 41, and the temperature control element 42 may be fixed to a surface of the supporting member 43 which is opposite to the optical filter 41, as illustrated in FIG. 8(a). In this case, it is preferable for the supporting member 43 having a larger external shape than the external shape of the optical filter 41 so that a portion of the supporting member 43 protrudes from an outer edge of the optical filter 41 to be used and for the temperature control element 42 to be fixed to the protruding portion of the supporting member 43.

Further, the temperature control element 42 may be directly fixed to one surface of the optical filter 41 without using the supporting member 43, for example, as illustrated in FIG. 8(b). In this case, it is preferable for the temperature control element 42 to be shifted from a center of the optical filter 41 to the extent that an edge of the optical filter 41 matches an edge of the temperature control element 42. Further, an annular temperature control element 44 may be used and fixed to one surface of the optical filter 41 so that the optical filter 41 and the temperature control element 44 are coaxial, for example, as illustrated in FIG. 8(c). Further, an electrical heating wire 46 made of a highly thermal conductive material may be used as the temperature control element, for example, as illustrated in FIG. 8(d). In this case, the electrical heating wire 46 may be fixed to one surface of the optical filter 41, and an end portion of the electrical heating wire 46 may be drawn to the outside of the optical filter 41 and connected to the temperature control unit 24. The electrical heating wire 46 is not limited to a linear electrical heating wire, and may have another shape such as a strip shape or a foil shape.

In a case in which the wavelength of the light source is adjusted using temperature, it is preferable for the characteristics of the optical filter to have no temperature dependence. Further, in a case in which the band of the optical filter is adjusted using temperature, it is preferable for the wavelength of the light source to be constant. In this case, it is preferable for a light source having a constant wavelength (for example, a DFB-LD, an external wavelength-stabilized laser using a grating or the like, or a light source separately having a temperature control means) to be used. However, temperature control of both the light source and the optical filter may be performed to adjust the light amount of the laser light L.

REFERENCE SIGNS LIST 1, 31: display device, 2, 32: optical scanning device, 5: combiner (display), 13 (13a to 13c): light source, 15: dichroic mirror (light combination unit), 17: signal scanning driving mirror (optical scanning unit), 21, 41: optical filter, 22, 42, 44: temperature control element, 23: environmental light detection sensor, 24: temperature control unit, 25, 45: temperature detection sensor, 26: light amount detection sensor, 46: electrical heating wire.

The invention claimed is:

1. A display device, comprising:
   an optical scanning device including a light source that outputs light, an optical scanning unit that scans the output light from the light source, and an optical filter arranged on an optical path of the output light;
   a display onto which the output light scanned by the optical scanning device is projected, with the output light superimposed on a background; and
   a temperature control unit that controls a temperature of the optical scanning device and controls a light amount of the output light directed from the optical filter to the display.

2. The display device according to claim 1,
   wherein the light source is a light source of which a wavelength of the output light has temperature dependence, and
   the temperature control unit controls a temperature of the light source.

3. The display device according to claim 1,
   wherein the optical filter is a filter of which a band characteristic has temperature dependence, and
   the temperature control unit controls a temperature of the optical filter.

4. The display device according to claim 1, further comprising:
   an environmental light detection sensor that detects a light amount of environmental light,
   wherein the temperature control unit controls the temperature of the optical scanning device based on the light amount of the environmental light detected by the environmental light detection sensor.

5. The display device according to claim 1,
   wherein the optical filter is arranged between the light source and the optical scanning unit.

6. The display device according to claim 1,
   wherein the optical filter is provided separately from another optical element forming the optical path of the output light.

7. The display device according to claim 1,
   wherein the light source includes a plurality of light sources of which wavelengths of output light beams are different from each other, and
   the display device further comprises a light combination unit that combines the respective output light beams from the plurality of light sources.

8. The display device according to claim 7,
   wherein the optical filter is arranged on a subsequent stage side of the optical path relative to the light combination unit.

9. The display device according to claim 7,
   wherein the optical filter is arranged between each light source and the light combination unit.

10. The display device according to claim 1, further comprising:
    a temperature detection sensor that detects a temperature of the optical scanning device.

11. The display device according to claim 1, further comprising:
    a light amount detection sensor that detects a light amount of the output light directed from the optical filter to the display.

* * * * *